US006676548B2

(12) United States Patent
Fujiwara

(10) Patent No.: US 6,676,548 B2
(45) Date of Patent: Jan. 13, 2004

(54) FIXING STRUCTURE OF A PULLEY UNIT

(75) Inventor: Hideki Fujiwara, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/033,049

(22) Filed: Oct. 25, 2001

(65) Prior Publication Data

US 2002/0058560 A1 May 16, 2002

(30) Foreign Application Priority Data

Oct. 26, 2000 (JP) .................................... P2000-326778
Jun. 20, 2001 (JP) .................................... P2001-186253

(51) Int. Cl.[7] ........................ F16H 13/04; F16D 41/067
(52) U.S. Cl. ....................... 474/70; 474/199; 192/41 R; 192/45
(58) Field of Search ............................ 474/70, 94, 199, 474/46; 464/30; 192/45, 110 B, 107 T, 107 M

(56) References Cited

U.S. PATENT DOCUMENTS 4,466,522 A * 8/1984 Shibuya ................... 192/84.81
4,808,082 A 2/1989 Kirchhofer et al.
5,163,883 A * 11/1992 Bradfield .................... 474/166
5,675,202 A 10/1997 Zenmei et al.
6,095,301 A 8/2000 Fujiwara et al.
6,170,625 B1 * 1/2001 Tanaka ........................ 192/45
6,237,736 B1 * 5/2001 Ouchi ......................... 474/70
6,394,248 B1 * 5/2002 Monahan et al. ......... 192/41 S

FOREIGN PATENT DOCUMENTS

EP 0710785 5/1996
JP 11-117758 4/1999

* cited by examiner

*Primary Examiner*—Marcus Charles
(74) *Attorney, Agent, or Firm*—Jordan and Hamburg LLP

(57) ABSTRACT

In a fixing structure of a pulley unit in which the pulley unit is attached to a part from which a rotary shaft that is inserted into and is rotatably supported by a central hole of a housing protrudes in a state where the rotary shaft is protruded from an end face of the housing, a housing side end portion of the pulley unit is inserted into an opening side area in the central hole of the housing so that an outer peripheral face of the housing side end portion of the pulley unit overlays an inner peripheral face of the opening side area in the central hole of the housing in a shaft center direction.

8 Claims, 5 Drawing Sheets

F I G. 1
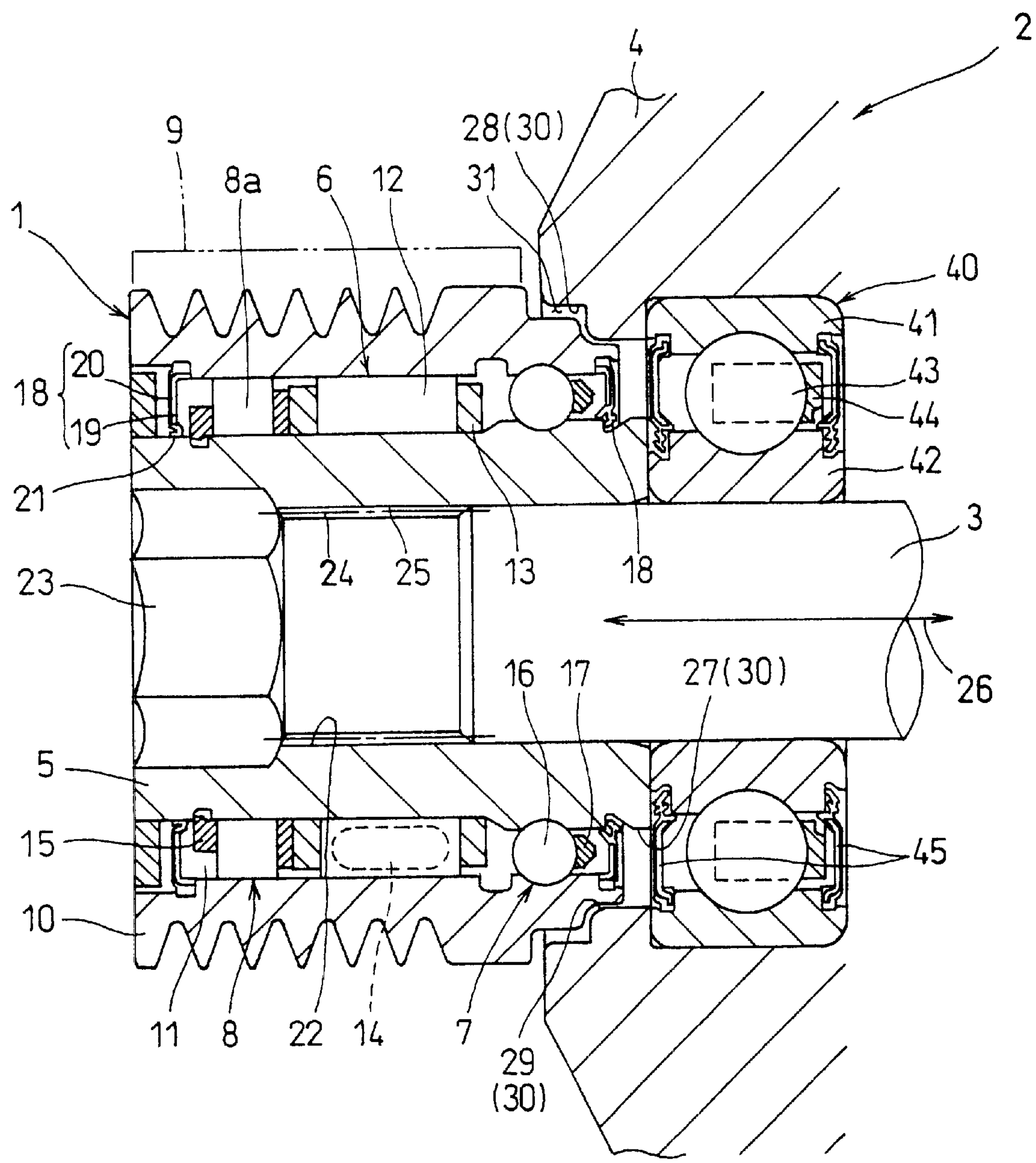

F I G. 2
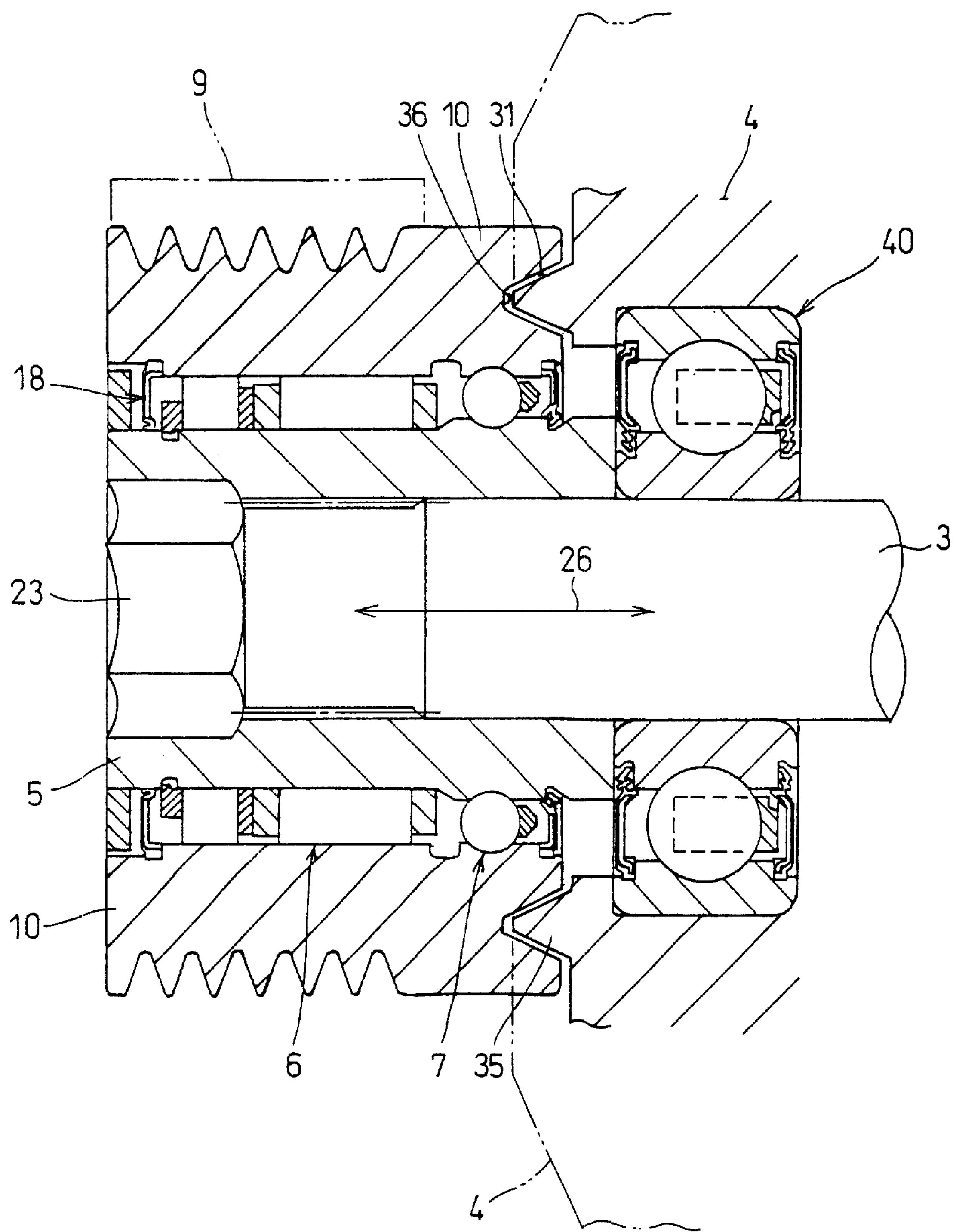

F I G. 3
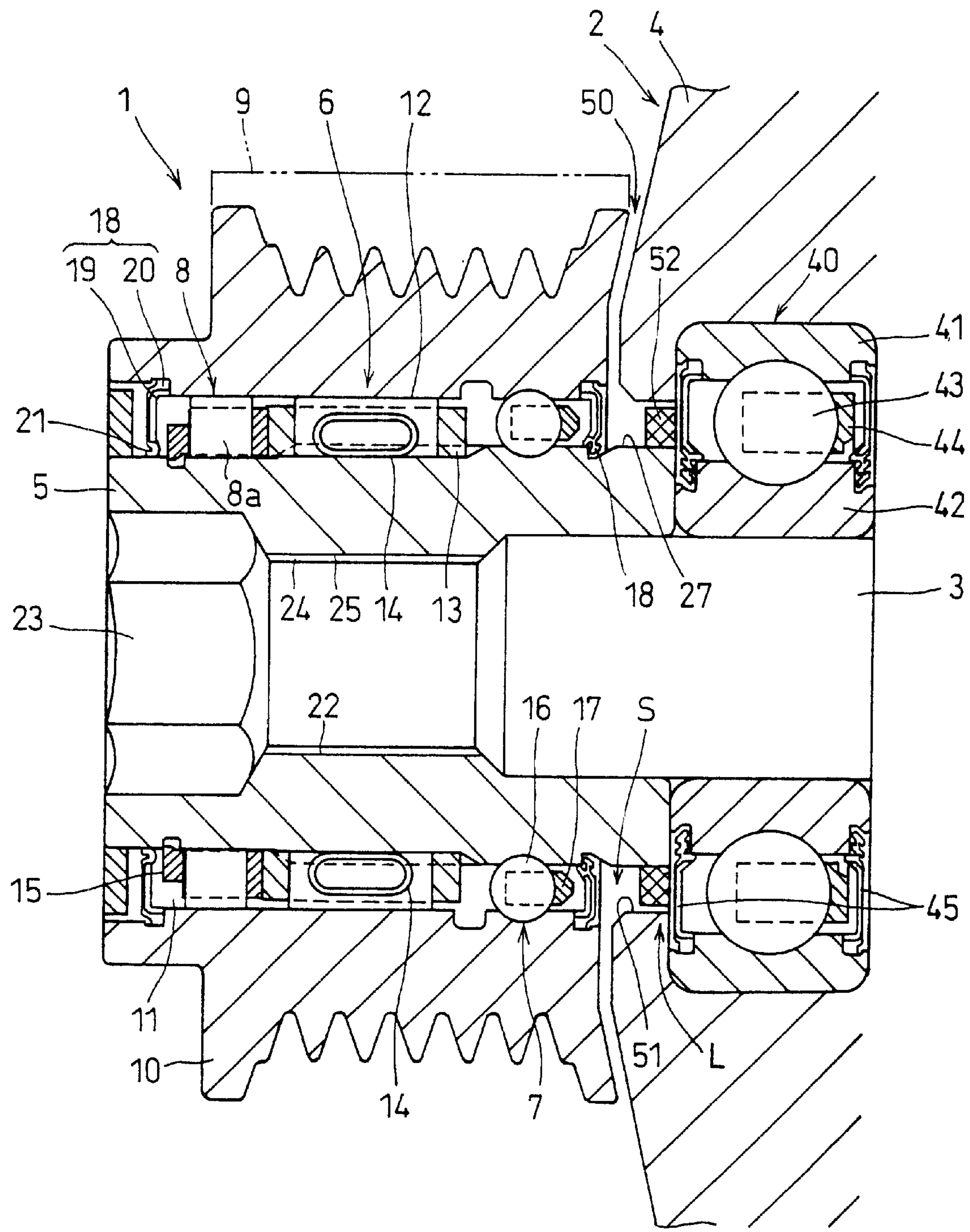

F I G. 4
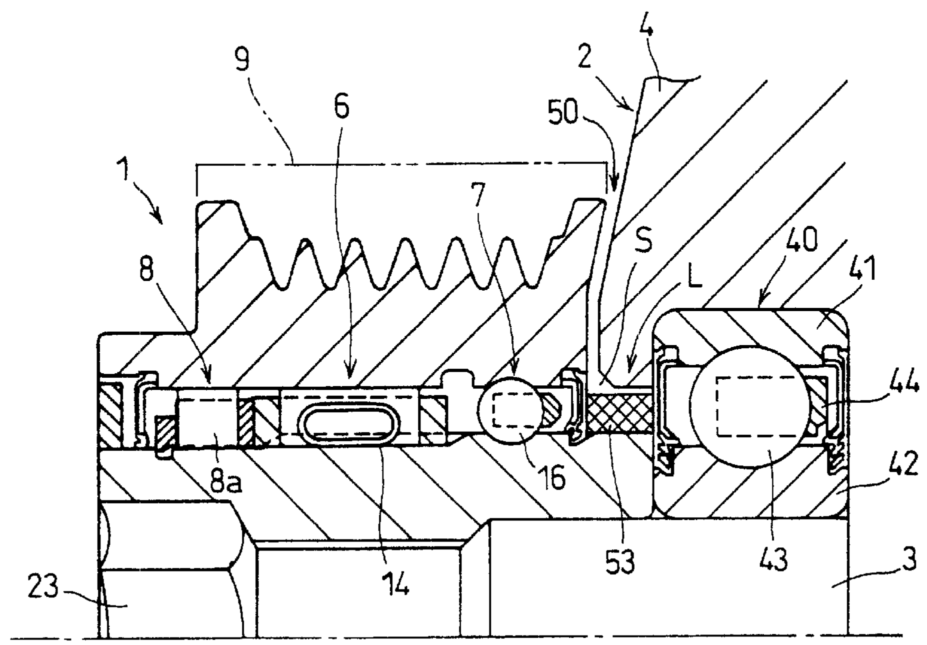
F I G. 5
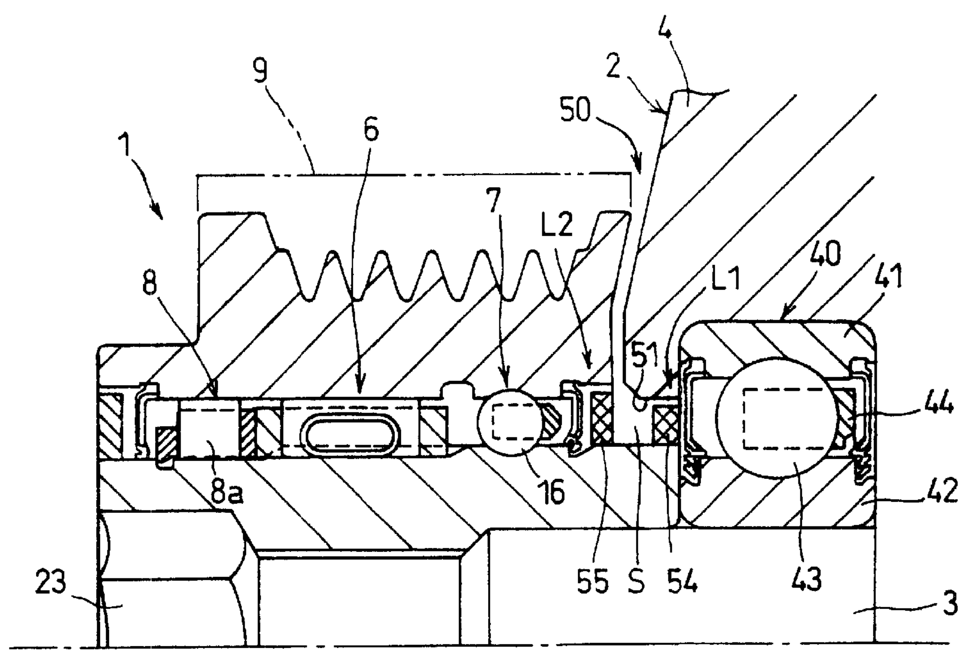

F I G. 6
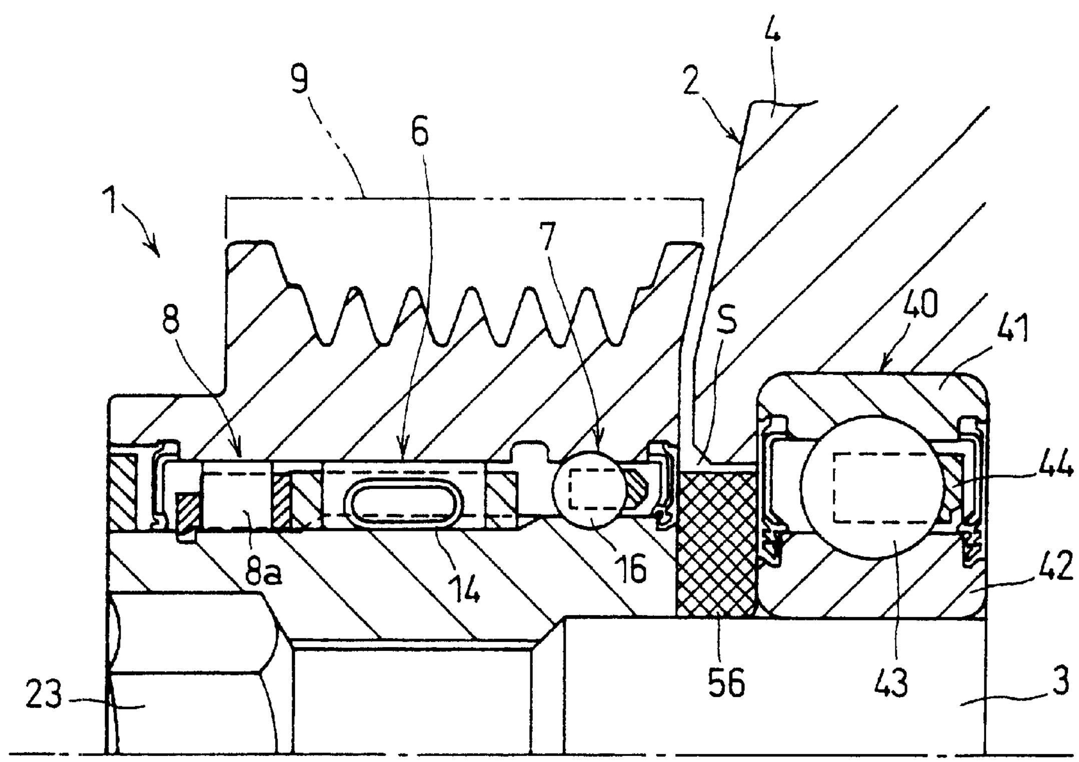

FIXING STRUCTURE OF A PULLEY UNIT

BACKGROUND OF THE INVENTION

The present invention relates to a fixing structure of a pulley unit for attaching the pulley unit to an auxiliary machine or the like with respect to a pulley unit provided with a one-way clutch.

Various auxiliary machines attached to an automobile engine are generally driven by a crank shaft of an automobile engine via a belt. Among auxiliary machines, for example, in the case of an alternator, as the number of revolutions of a crank shaft decreases, the power generating capacity also decreases. Responding to this, there is a technique that a one-way clutch is incorporated in a pulley unit that is attached to an alternator so that the number of revolutions of the rotor of the alternator is kept by inertial force to maintain the power generating efficiency when the number of revolutions of a crank shaft decreases.

In the case of such a pulley unit, for example when the pulley unit is attached to an alternator, since a one-way clutch is incorporated, the width in the shaft center direction becomes large, and thus the width in the shaft center direction of the whole apparatus including the alternator becomes large.

SUMMARY OF THE INVENTION

Therefore, the main object of the present invention is to provide a structure for fixing a pulley unit in which in the case where the pulley unit is attached to an auxiliary machine or the like, the width in the shaft center direction of the whole apparatus including the auxiliary machine and the pulley unit can be miniaturized.

Other objects, features, and advantages of the present invention will be apparent from the following description.

In summary a fixing structure of a pulley unit according to the present invention has a structure in which a rotary shaft is inserted into and supported by a central hole of a housing in a state where the rotary shaft is protruded from an end face of the housing and in which the pulley unit is attached to a part of the rotary shaft protruding from the central hole of the housing, wherein a housing side end portion of the pulley unit is inserted into an opening side area in the central hole of the housing so that an outer peripheral face of the housing side end portion of the pulley unit overlays an inner peripheral face of the opening side area in the central hole of the housing in a shaft center direction.

In the present invention, preferably, the outer peripheral face of the housing side end portion of the pulley unit and the inner peripheral face of the opening side area in the central hole of the housing oppose each other in the radial direction thereof via a fine gap forming a non-contact sealing part.

BRIEF DESCRIPTION OF THE DRAWINGS

These and other objects as well as advantages of the invention will becomes clear by the following description of preferred embodiments of the invention with reference to the accompanying drawings, wherein:

FIG. 1 shows a fixing structure of a pulley unit according to a preferred embodiment of the present invention and is a sectional view of the pulley unit and an alternator attached thereto;

FIG. 2 shows another fixing structure of a pulley unit according to the present invention and is a sectional view of the pulley unit and an alternator attached thereto;

FIG. 3 shows still another fixing structure of a pulley unit according to the present invention and is a sectional view of the pulley unit and an alternator attached thereto;

FIG. 4 shows still another fixing structure of a pulley unit according to the present invention and is a sectional view showing the upper half of the pulley unit and an alternator attached thereto;

FIG. 5 shows still another fixing structure of a pulley unit according to the present invention and is a sectional view showing the upper half of the pulley unit and an alternator attached thereto; and FIG. 6 shows still another fixing structure of a pulley unit according to the present invention and is a sectional view showing the upper half of the pulley unit and an alternator attached thereto.

In all these figures, like components are indicated by the same numerals.

DETAILED DESCRIPTION OF PREFERRED EMBODIMENTS

A pulley unit in accordance with a preferred embodiment of the present invention is explained referring to FIG. 1. The pulley unit 1 is attached to an alternator 2 that is an auxiliary machine of an engine. An auxiliary machine may be a compressor for an air conditioner, a water pump, a cooling fan, or the like other than an alternator.

The pulley unit 1 is arranged in a part which couples the driving part of an engine with a power generating rotary shaft 3 of the alternator 2. The pulley unit 1 has a hollow shaft 5. The rotary shaft 3 is inserted into and is rotatably supported by a central hole of a fixed housing 4 in a state where the shaft 3 protrudes from an end face of the housing 4.

The hollow shaft 5 is fitted on the outside of the above-mentioned protruding part of the rotary shaft 3 so as to be rotatable as an integral unit therewith. A pulley 10 is fitted on the outside of the hollow shaft 5 via a one-way clutch 6, a deep groove ball bearing 7 arranged in an alternator 2 side, and a roller bearing 8 arranged in the opposite side to the deep groove ball bearing 7 (any one of them is one example of a rolling bearing). A power transmission V-ribbed belt 9 to which motive power from the engine is transmitted is wound around the pulley 10. That is, the pulley 10 is fitted on the outer diameter side of the hollow shaft 5 in a state where the pulley 10 makes an annular space 11. Wave-like grooves into which concavity and convexity of the inner peripheral face of the belt 9 are fitted are formed on the outer peripheral face of the pulley 10.

The one-way clutch 6 is for switching between a state where the pulley 10 and the hollow shaft 5 are rotated as an integral unit and a state where they are relatively rotated and is arranged at a central position in the shaft center direction of the annular space 11 in which the pulley 10 and the hollow shaft 5 oppose each other. The one-way clutch 6 has a roller 12 as a rolling element, as well as the inner ring raceway track of the roller 12 corresponds to the outer peripheral face of the hollow shaft 5 while the outer ring raceway track thereof corresponds to the inner peripheral face of the pulley 10. In addition, the one-way clutch 6 further has an annular roller retainer 13 made of a synthetic resin and an elliptical coil spring 14 having a function of biasing the roller 12 toward a narrow side (lock side) of a wedge-like space, which is not shown. The roller 12 is biased toward the lock side so that the one-way clutch 6 switches to a locked state where the pulley 10 and the hollow shaft 5 are rotated as an integral unit, while the roller 12 is moved toward the opposite side to the lock side so that the one-way clutch 6 switches to a free state where the pulley 10 and the hollow shaft 5 are relatively rotated.

In the ball bearing 7, the inner ring raceway track of balls 16 corresponds to the outer peripheral face of the hollow shaft 5 while the outer ring raceway track thereof corresponds to the inner peripheral face of the pulley 10, and the ball bearing 7 has a retainer 17. In the roller bearing 8, the inner ring raceway track of a roller 8a corresponds to the outer peripheral face of the hollow shaft 5 while the outer ring raceway track thereof corresponds to the inner peripheral face of the pulley 10, and the roller bearing 8 has a retainer 15.

These ball bearing 7 and roller bearing 8 are arranged in the annular space 11 so as to support the hollow shaft 5 and the pulley 10 so that they can rotate relatively.

Seal members 18 for sealing the annular space 11 are attached to the outsides of the respective roller bearing 8 and ball bearing 7 in the shaft center direction 26. These seal members 18 are composed of annular core bars 19 and elastic bodies 20 covering the outsides of the annular core bars 19, and one end sides of the elastic bodies 20 in the radial direction thereof are fixed to the inner diameter face of the pulley 10 while the other end sides thereof correspond to seal lips 21 to be in contact with the outer peripheral face of the hollow shaft 5.

An operation groove 23 into which a tool (e.g., a hexagon wrench) for rotating the hollow shaft 5 is fitted is formed in the free end side of a central hole 22 of the hollow shaft 5, and a female screw part 25 into which a male screw part 24 formed on the halfway of the rotary shaft 3 is screwed is formed on the halfway of the central hole 22.

An insert recessed spot 30 is formed on the inner periphery of the opening side area in the central hole of the housing 4 so that the end part of the pulley unit 1 side of the housing 4 and the end part of the housing 4 side of the pulley unit 1 are overlaid in the radial direction. Regarding this insert recessed spot 30, a small diameter recessed portion 27 in a ball bearing 40 side of the housing 4 and a large diameter recessed portion 28 of the pulley unit 1 side are formed into annular shapes via a stepped face 29. The end part of the pulley unit 1 is constructed so as to be inserted into the insert recessed spot 30.

The ball bearing 40 of the housing 4 is composed of an outer ring member 41 fitted into the housing 4, an inner ring member 42 fitted on the rotary shaft 3, balls 43 as rolling elements, a retainer 44 for the balls 43, and seal members 45 of both sides.

An end face of the hollow shaft 5 abuts a side face of the inner ring 42 of the ball bearing 7 of the housing 4, an end part of the pulley 10 is formed into a relative shape with a step along the stepped face 29, and a fine gap 31 is formed between an end part of the pulley unit 1 and an end part of the housing 4. This fine gap 31 constitutes a non-contact sealing part.

In this case, a non-contact seal member is formed by the stepped face 29 in the end face of the housing 4 and the end part of the pulley 10 along the stepped face 29.

In the pulley unit 1 having the structure described above, the one-way clutch 6 becomes the locked state or the free state in accordance with rotation speed differences between the pulley 10 and the hollow shaft 5, and power is transmitted from the pulley 10 to the hollow shaft 5 or is interrupted. When the one-way clutch 6 becomes the free state, the hollow shaft 5 keeps rotation by the rotation inertial force thereof.

In order to attach the pulley unit 1 to the rotary shaft 3 for power generation, the pulley unit 1 is thrust onto the power generating rotary shaft 3 until the female screw part 25 abuts the male screw part 24. Then, a tool is fitted into the operation groove 23 of the hollow shaft 5 so that the tool is rotated. The hollow shaft 5 plays a function of a nut, and the pulley unit 1 itself moves toward the housing 4 side. The hollow shaft 5 is rotated by the tool until the hollow shaft 5 is pressed against the inner ring 42 of the ball bearing 7 of the alternator 2 at a predetermined pressure so as to ensure the fine gap 31 between the end part of the pulley unit 1 and the end part of the housing 4.

By attaching the pulley unit 1 to the alternator 2 in such a manner, the end part of the pulley unit 1 overlaps the shaft center direction 26 at the end part of the housing 4, that is, at the insert recessed spot 30.

Since the insert recessed spot 30 having the stepped face 29 is provided on the end part of the housing 4 as described above, and since the end part of the pulley unit 1 is formed into a shape along the insert recessed spot 30 having the stepped face 29, the fine gap 31 for the non-contact sealing part is provided therebetween. When the pulley 10 rotates in accordance with the rotation of the belt 9, a labyrinth function works by the fine gap 31, and it can be prevented that water or other foreign matters invades the fine gap 31 from the outside. Thus, the life of the pulley unit 1 or the ball bearing 7 of the alternator 2 can be prolonged.

The insert recessed spot 30 is formed on the end part of the housing 4, and the pulley unit 1 is attached to the alternator 2 so that the end part of the pulley unit 1 is inserted into the inset recessed spot 30. Thus, even when the pulley unit 1 has the ball bearing 7, the roller bearing 8 and the one-way clutch 5 and thereby is long in the shaft center direction 26 compared with a solid pulley, the length of the whole apparatus can be shortened in the shaft center direction 26 by that part, and thus saving space can be realized compared with a conventional attaching structure of this type.

The example of the case described above corresponds to a case where the diameter of the pulley 10 is relatively small since the end part of the pulley unit 1 overlaps the end part of the housing 4 as described above.

Next, other examples regarding a fixing structure of a pulley unit are explained referring to FIG. 2 and the following drawings thereof.

First, referring to FIG. 2, this pulley unit 1 is useful for a case where the diameter of the pulley 10 is relatively large. An annular protruded portion 35 protruding toward the shaft center direction 26 is formed on the end part of the housing 4. A recessed portion 36 into which the protruded portion 35 is fitted via the fine gap 31 for the non-contact sealing is formed on the end face of the pulley 10.

The outer peripheral faces of the protruded portion 35 and the recessed portion 36 correspond to tilted faces tilted to the pulley unit 1 side relative to the shaft center direction 26, and the inner peripheral faces of the protruded portion 35 and the recessed portion 36 correspond to tilted faces tilted to the outside relative to the shaft center direction 26.

In the structure described above, when the pulley 1 rotates, the labyrinth function works by the fine gap 31, and water or other foreign matters can be reliably prevented from invading the fine gap 31 from the outside. Thus, the life of the pulley unit 1 or the ball bearing 7 of the alternator 2 can be prolonged.

In a case where the housing 4 can be miniaturized in the shaft center direction 26, for example, in a case where an outward appearance line part shown by virtual lines of FIG. 2 can be omitted, the width of the apparatus in the shaft center direction 26 can be miniaturized.

Referring to FIG. 3, the pulley unit 1 lies adjacent to the alternator 2 in the shaft center direction. Therefore, the end face of the alternator 2 side of the pulley 10 lies fairly adjacent to the outer peripheral face of the housing 4.

Accordingly, the gap between the end face of the pulley 10 and the outer peripheral face of the housing 4 is relatively narrow, having a certain extent of path length in the radial direction, whereby the gap has a function as a labyrinth.

The hollow shaft 5 enters a through hole 51 formed in the housing 4 in a state where the end face of the hollow shaft 5 abuts the end face of the inner ring 42 of the ball bearing 40 that rotatably supports the rotary shaft 3 in the housing 4.

A gap space portion S is annularly formed between an outer peripheral face 27 of the hollow shaft 5 and an inner peripheral face of the through hole 51, and this gap space portion S communicates with the outside via a gap 50.

An annular seal member 52 made of metal or elastic rubber is fitted on an end part of the outer periphery of the hollow shaft 5 so as to fill a part close to the ball bearing 40 in the gap space portion S.

A fine space is formed between the outer peripheral face of the annular seal member 52 and the through hole 51 so as to construct a labyrinth seal portion L.

Therefore, since the labyrinth seal portion L is provided, even when water or foreign matters such as dust invades to the gap space portion S from the outside via the gap 50, such foreign matter can be prevented from invading to the ball bearing 40.

Referring to FIG. 4, in a case of this pulley unit 1, an annular seal member 53 made of metal or elastic rubber is fitted on the outer periphery of the hollow shaft 5 covering approximately whole area in the shaft center direction in the gap space portion S so as to construct the labyrinth seal portion L in the fine gap between the outer peripheral face of the annular seal member 53 and the inner peripheral face of the through hole 51.

In this case, since the gap space portion S becomes the state where the portion S is filled with the annular seal member 53 covering approximately whole area in the shaft center direction, invasion to the ball bearing 40 by a foreign matter can be further prevented by means of the labyrinth seal portion L.

Referring to FIG. 5, in a case of this pulley unit 1, annular seal members 54, 55 are fitted on the outer periphery of the hollow shaft 5 while the respective members 54, 55 are divided between a part close to the ball bearing 40 and a part of the pulley 10 side in the shaft center direction in the gap space portion S so as to constitute a labyrinth seal portion L1 in a fine gap between the outer peripheral face of the annular seal portion 54 and the inner peripheral face of the through hole 51 and a labyrinth seal portion L2 in a fine gap between the outer peripheral face of the annular seal portion 55 and the inner peripheral face of the pulley 10.

In this case, prevention of invasion of a foreign matter to the ball bearing 40 can be achieved by means of the labyrinth seal portion L1, and prevention of invasion of a foreign matter to the ball bearing 7, the one-way clutch 6, and the like in the pulley unit 1 from the gap space portion S side can be achieved by means of the labyrinth seal portion L2.

In the embodiments described above, although shown is a structure that an annular seal member is provided on the hollow shaft and that a fine gap of a labyrinth seal portion is provided between the housing and the annular seal member, the annular seal member may be provided on the housing side, and the fine gap of the labyrinth seal portion may be formed between opposing faces of the hollow shaft and the annular seal member.

Referring to FIG. 6, in a case of this pulley unit 1, the end face of the hollow shaft 5 and the end face of the pulley 10 in the alternator 2 side are constructed to be approximately flush, a gap space portion S is formed so as to be surrounded by the end face of the hollow shaft 5, the ball bearing 40, and the outer peripheral face of the power generating rotary shaft 3, an annular seal member 56 constructed so as to fill approximately the whole space of the gap space portion S is fitted on the outside of the power generating rotary shaft 3, and a labyrinth seal portion L is constructed by the fine gap between the outer peripheral face of the annular seal member 56 and inner peripheral face of the through hole 51.

In this case, by means of the labyrinth seal portion L, prevention of invasion of a foreign matter to the ball bearing 40 can be achieved, as well as invasion of a foreign matter to the ball bearing 7, the one-way clutch 6, and the like in the pulley unit 1 through the gap space portion S side can be prevented.

As shown in FIG. 6, in the structure that the gap space portion S is formed between the end face of the hollow shaft 5 and the ball bearing 40 to be surrounded by the outer peripheral face of the power generating rotary shaft 3, also included in the present invention are structures that (a) in the gap space portion S, the annular seal member 56 is arranged to come near to one side of the ball bearing 40 relative to the housing 4 of the power generating rotary shaft 3, (b) in the gap space portion S, the annular seal member 56 is constructed covering approximately whole area between the pulley unit 1 and the alternator 2 in the shaft center direction so as to form a fine gap, and (c) a second annular seal member distinct from the annular seal member 56 is provided to be fixed on either side of the hollow shaft or the pulley.

Also included is a case where the annular seal member 56 is fixed on the housing 4 and the gap space portion is provided between the pulley unit and the housing of an auxiliary machine and around an input shaft. Further, the annular seal member may be divided for a plurality of places of a place close to the pulley unit in the shaft center direction in the gap space portion and a place close to a bearing device for an input shaft of the housing.

In the respective embodiments described above, although shown is a structure that the outer rings and the inner rings of rolling bearings provided in both sides of a one-way clutch serve for the respective pulley and hollow shaft as an integral unit, the outer rings and the inner rings of the rolling bearings may be formed as separate bodies distinct from the pulley and the hollow shaft.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A fixing structure of a pulley apparatus, comprising:

a housing having a housing end face with a central hole;

a rotary shaft supported by said central hole of said housing in a state where the rotary shaft is protruded from said housing end face;

a pulley unit attached to a part of the rotary shaft protruding from the central hole of the housing; and said pulley unit having an outer ring and a one-way clutch rotatably supporting said outer ring on said rotary shaft such that said outer ring and said rotary shaft rotate as an integral unit in a first state, and said outer ring and said rotary shaft rotate relative one another in a second state;

said outer ring having a housing side end portion inserted into an opening side area of said central hole of said housing so that an outer peripheral face of said housing side end portion of said outer ring overlays an inner peripheral face of said opening side area in a shaft center direction.

2. The fixing structure of a pulley apparatus according to claim 1, wherein said outer peripheral face of said housing side end portion of said outer ring and the inner peripheral face of said opening side area of said housing are oppose in an axial direction thereof defining a gap.

3. The fixing structure of a pulley apparatus according to claim 1, wherein the outer peripheral face of said housing side end portion of said outer ring and the inner peripheral face of said opening side area oppose in a radial direction thereof via a fine gap forming a non-contact sealing part.

4. The fixing structure of a pulley apparatus according to claim 3, wherein said outer peripheral face of said housing side end portion of said outer ring and said inner peripheral face of said opening side area of said housing each take the form of an annular stepped surface in which a pulley unit side has a larger diameter than a housing side.

5. The fixing structure of pulley apparatus according to claim 3, wherein said outer peripheral face of said housing side end portion of said outer ring has an annular recess and said opening side area of said housing has an annular protrusion fitted in said annular recess.

6. The fixing structure of a pulley apparatus according to claim 1, wherein said pulley unit comprises a hollow shaft fitted on the outside of said rotary shaft so that said hollow shaft can rotate with said rotary shaft as an integral unit, the outer ring being fitted on the outer diameter side of said hollow shaft in a state where an annular space is formed, the one-way clutch being arranged in said annular space, and a rolling bearing which is arranged in said annular space adjacent said one-way clutch and supports said hollow shaft and said outer ring so that said hollow shaft and said outer ring can be relatively rotated.

7. The fixing structure of a pulley apparatus according to claim 6, wherein a rolling bearing rotatably supporting said rotary shaft relative to said housing is provided inside the central hole of said housing, and wherein a housing side end portion of the hollow shaft of said pulley unit is inserted into the central hole of said housing so as to be in contact with an end face of said rolling bearing in said housing.

8. The fixing structure of a pulley apparatus according to claim 6, wherein said one-way clutch includes a rolling element, an inner ring raceway track of said rolling element is constituted by an outer peripheral face of said hollow shaft while an outer ring raceway track of said rolling element is constituted by an inner peripheral face of said outer ring, said rolling bearing is provided adjacent at least one side of said one-way clutch and includes a rolling element, and an inner ring raceway track of the rolling element is constituted by an outer peripheral face of said hollow shaft while an outer ring raceway track of said rolling element is constituted by an inner peripheral face of said outer ring.

* * * * *